(12) United States Patent
Lo

(10) Patent No.: US 12,209,701 B2
(45) Date of Patent: Jan. 28, 2025

(54) COSMETIC MOUNT

(71) Applicant: RQ Innovasion Inc., Edmonton (CA)

(72) Inventor: Lenny Kwok Ming Lo, Edmonton (CA)

(73) Assignee: RQ Innovasion Inc., Edmonton (CA)

( * ) Notice: Subject to any disclaimer, the term of this patent is extended or adjusted under 35 U.S.C. 154(b) by 0 days.

(21) Appl. No.: 18/332,181

(22) Filed: Jun. 9, 2023

(65) Prior Publication Data

US 2024/0410516 A1    Dec. 12, 2024

(51) Int. Cl.
*F16M 11/06* (2006.01)
*F16M 11/20* (2006.01)

(52) U.S. Cl.
CPC ......... *F16M 11/06* (2013.01); *F16M 11/2007* (2013.01)

(58) Field of Classification Search
CPC ..... F16M 11/06; F16M 11/2007; F16M 11/00
See application file for complete search history.

(56) References Cited

U.S. PATENT DOCUMENTS

| | | | | |
|---|---|---|---|---|
| 1,063,220 A * | 6/1913 | Seamon | ............ | F16M 11/12 248/278.1 |
| 2,915,944 A * | 12/1959 | Butts | ............ | G02B 5/08 248/467 |
| 4,856,888 A * | 8/1989 | Wahl | ............ | G02B 7/1824 359/881 |
| 4,872,630 A * | 10/1989 | Cooper | ............ | F16M 13/027 248/278.1 |
| 5,566,030 A * | 10/1996 | Yue | ............ | A45D 42/00 359/872 |
| 6,130,790 A * | 10/2000 | Tu | ............ | B60R 1/082 359/872 |
| 6,419,196 B1 * | 7/2002 | Sweere | ............ | F16M 11/105 248/280.11 |
| 9,038,971 B1 * | 5/2015 | Guthrie | ............ | F16M 11/40 361/679.56 |
| 9,791,097 B2 * | 10/2017 | Bowman | ............ | F16M 11/28 |
| 9,800,283 B2 * | 10/2017 | Schmidt | ............ | A45C 13/1069 |
| 10,583,790 B2 * | 3/2020 | Wang | ............ | F16M 13/00 |
| 10,865,934 B2 * | 12/2020 | Kwasniewski | ...... | F16M 11/041 |
| 11,019,910 B2 * | 6/2021 | Walton | ............ | F16M 11/105 |
| 11,852,289 B2 * | 12/2023 | Barilotti | ............ | F16M 11/2021 |
| 11,980,303 B2 * | 5/2024 | Boehm | ............ | A47G 1/17 |
| 2004/0221501 A1 * | 11/2004 | Schaak | ............ | F16M 11/105 40/607.04 |
| 2013/0068915 A1 * | 3/2013 | Yang | ............ | F16M 11/041 248/551 |
| 2014/0226281 A1 * | 8/2014 | Emami | ............ | F16M 11/26 248/124.2 |

(Continued)

*Primary Examiner* — Monica E Millner
(74) *Attorney, Agent, or Firm* — Patterson + Sheridan, LLP

(57) ABSTRACT

The present disclosure describes a cosmetic mount (e.g., for mounting a cosmetic mirror to a wall) and a system that include the cosmetic mount. The cosmetic mount includes a base, an arm, and a coupler. The arm is coupled to the base at a first end of the arm. The coupler includes a coupler arm, a coupler base, and a coupler disk. The coupler arm is rotatably coupled to a second end of the arm opposite the first end such that the coupler arm extends from the arm along a first axis. The coupler base is coupled to the coupler arm. The coupler disk is coupled to the coupler base such that the coupler disk is rotatable about the first axis.

15 Claims, 8 Drawing Sheets

(56) References Cited

U.S. PATENT DOCUMENTS

| | | | |
|---|---|---|---|
| 2015/0237750 A1* | 8/2015 | Yang | F16M 11/041 206/45.2 |
| 2015/0369418 A1* | 12/2015 | Wong | F16M 13/00 248/309.3 |
| 2020/0064590 A1* | 2/2020 | Boehm | F16B 47/00 |
| 2021/0062962 A1* | 3/2021 | Chang | F16M 11/14 |
| 2023/0024561 A1* | 1/2023 | Lee | F16M 11/22 |

* cited by examiner

COSMETIC MOUNT

TECHNICAL FIELD

Embodiments presented in this disclosure generally relate to cosmetic products. More specifically, embodiments disclosed herein relate to a cosmetic mount (e.g., to mount a mirror to a wall).

BACKGROUND

Cosmetic mirrors may be used to present reflections to a user while applying cosmetic products. These mirrors may be mounted to surfaces (e.g., walls) to provide a better view or reflection to the user.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
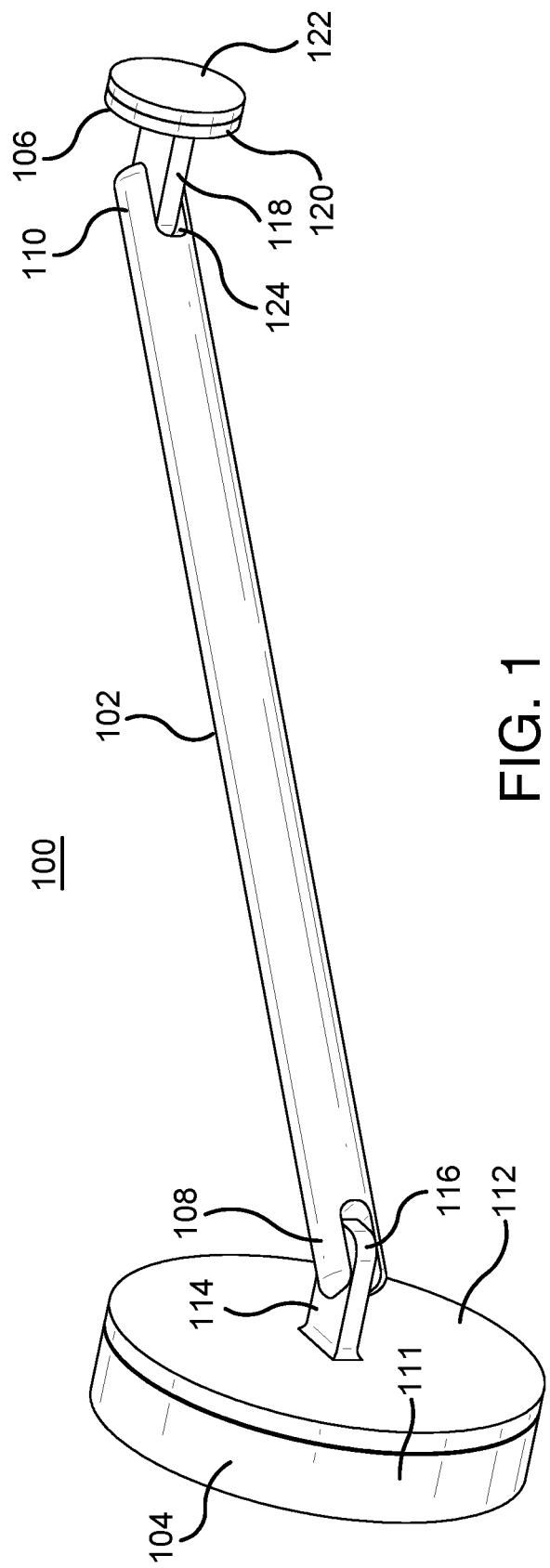
FIG. 1 illustrates an example cosmetic mount.

The present disclosure describes a cosmetic mount (e.g., for mounting a cosmetic mirror to a wall) and a system that include the cosmetic mount. According to an embodiment, the cosmetic mount includes a base, an arm, and a coupler. The arm is coupled to the base at a first end of the arm. The coupler includes a coupler arm, a coupler base, and a coupler disk. The coupler arm is rotatably coupled to a second end of the arm opposite the first end such that the coupler arm extends from the arm along a first axis. The coupler base is coupled to the coupler arm. The coupler disk is coupled to the coupler base such that the coupler disk is rotatable about the first axis.

According to another embodiment, a system includes an arm, a coupler, and a mirror. The coupler includes a coupler arm, a coupler base, and a coupler disk. The coupler arm is rotatably coupled to a first end of the arm such that the coupler arm extends from the arm along a first axis. The coupler base is coupled to the coupler arm. The coupler disk is coupled to the coupler base such that the coupler disk is rotatable about the first axis. The mirror engages the coupler disk such that the mirror is rotatable in-plane.

According to another embodiment, an apparatus includes an arm, a base arm, a base disk, a foundation, a coupler arm, a coupler base, and a coupler disk. The arm includes a first end and a second end opposite the first end. The base arm is coupled to the first end of the arm such that the base arm extends from the arm along a first axis. The base disk is coupled to the base arm. The foundation is coupled to the base disk such that the foundation is rotatable about the first axis. The coupler arm is rotatably coupled to the second end of the arm such that the coupler arm extends from the arm along a second axis. The coupler base is coupled to the coupler arm. The coupler disk is coupled to the coupler base such that the coupler disk is rotatable about the second axis.

EXAMPLE EMBODIMENTS

Cosmetic mirrors may be used to present reflections to a user while applying cosmetic products. Cosmetic mirrors may be mounted to surfaces (e.g., walls) to provide a better view or reflection to the user. Typically, these cosmetic mirrors are permanently mounted to the wall by a mount, and these mounts may not allow the mirror to rotate in-plane. Rather, these mounts may allow the mirror to rotate about an axis that laterally bisects the mirror so that the mirror may be angled upwards or downwards.

The present disclosure describes a cosmetic mount that may be used to mount a cosmetic product (e.g., a mirror) to a surface. The cosmetic mount may include several components that allow for several degrees of rotation and movement. The cosmetic mount includes a base that attaches to the surface (e.g., using magnets, suction cups, screws, an adhesive, or any other suitable attachment mechanism). The cosmetic mount includes an arm rotatably attached to the base, and the cosmetic mount includes a coupler rotatably attached to the arm. The coupler includes a coupler disk that can attach to a cosmetic product (e.g., using magnets, suction cups, an adhesive, etc.). The coupler disk may spin in-plane like a wheel. As a result, when the cosmetic product is attached to the coupler disk, the cosmetic product may also spin or rotate in-plane (e.g., in the plane of the cosmetic product). When a user has finished using the cosmetic product, the user may detach the cosmetic product from the coupler disk and detach the cosmetic mount from the surface. In this manner, the cosmetic mount provides for several degrees of motion (e.g., in-plane rotation of the cosmetic product) and allows for attachment to and detachment from many types of surfaces.

FIG. 1 illustrates an example cosmetic mount 100. As seen in FIG. 1, the cosmetic mount 100 includes an arm 102, a base 104, and a coupler 106. Generally, the cosmetic mount 100 allows a cosmetic product (e.g., a mirror) to be mounted to a surface (e.g., a wall). The cosmetic mount 100 provides for several degrees of movement while mounted to the surface. For example, the arm 102 may rotate about the base 104 in a first plane of rotation. The components of the base 104 may also rotate in a second plane of rotation. The coupler 106 may rotate about the arm 102 in a third plane of rotation. The components of the coupler 106 may also rotate in a fourth plane of rotation. In this manner, the cosmetic mount 100 allows for several levels and types of adjustment when the cosmetic mount 100 has mounted a cosmetic product to a surface.

The arm 102 may couple to the base 104 and the coupler 106. The arm 102 may be made of any suitable material (e.g., metal, plastic, wood, etc.). In some embodiments, the arm 102 is a rigid component that extends from the base 104. In certain embodiments, the arm 102 may include a hinge or another movable component that allows the arm 102 to bend or flex. As see in FIG. 1, the arm 102 includes a first end 108 and a second end 110. The first end 108 may be at an opposite end of the arm 102 as the second end 110. The first end 108 may be coupled to the base 104, and the second end 110 may be coupled to the coupler 106.

The base 104 may attach the cosmetic mount 100 to a surface (e.g., a mirror or a wall). The base 104 may also be detached from the surface. The base 104 may be made of any suitable material (e.g., metal, plastic, wood, etc.) As seen in FIG. 1, the base 104 includes a foundation 111, a base disk 112, and a base arm 114. The base arm 114 may extend from a surface of the base disk 112 that is facing the arm 102. The foundation 111 may be coupled to an opposite surface of the base disk 112. The base arm 114 may couple to the first end 108 of the arm 102 using a hinge 116. The hinge 116 may allow the base arm 114 (and as a result, the base 104) to rotate about the hinge 116, and vice versa. The foundation 111 may include a magnet, a suction cup, an adhesive, or another material on the surface opposite the base disk 112 that may allow the foundation 111 to attach to and detach from the surface. When the foundation 111 is attached to a surface, the hinge 116 may allow the arm 102 to rotate about the hinge 116. As a result, the hinge 116 rotatably couples the base 104 with the arm 102.

The foundation 111 and the base disk 112 may be shaped similar to each other. In the example of FIG. 1, the foundation 111 and the base disk 112 are cylindrical with similar radii. The foundation 111 may have a greater thickness than the base disk 112. The foundation 111 and the base disk 112 may also be rotatably coupled to each other. For example, the foundation 111 and the base disk 112 may rotate, with respect to each other, in the plane of the foundation 111 or the base disk 112. When the foundation 111 is attached to a surface, the base disk 112 may rotate, with respect to the foundation 111, in the plane of the base disk 112. The rotation of the base disk 112 in the plane of the base disk 112 may cause the arm 102 to rotate, and vice versa.

The coupler 106 is coupled to the second end 110 of the arm 102. The coupler 106 may be made of any suitable material (e.g., metal, plastic, wood, etc.) As see in FIG. 1, the coupler 106 includes a coupler arm 118, a coupler base 120, and a coupler disk 122. The coupler arm 118 extends from a surface of the coupler base 120 facing the arm 102. The coupler arm 118 may couple to the second end 110 of the arm 102 by a hinge 124. The hinge 124 may allow the coupler arm 118 to rotate about the hinge 124. When the coupler arm 118 rotates about the hinge 124, the coupler base 120 and the coupler disk 122 may also move along with the coupler arm 118. As a result, the hinge 124 rotatably couples the coupler 106 with the arm 102.

The coupler disk 122 may be coupled to an opposite surface of the coupler base 120. The coupler base 120 and the coupler disk 122 may be shaped similar to each other. In the example of FIG. 1, the coupler base 120 and the coupler disk 122 are cylindrical with similar radii. The coupler base 120 may have a similar thickness to the coupler disk 122. The coupler base 120 and the coupler disk 122 may also be rotatably coupled to each other. For example, the coupler disk 122 may rotate, with respect to the coupler base 120, in the plane of the coupler disk 122. The coupler disk 122 may attach to and detach from a cosmetic product (e.g., a mirror). The coupler disk 122 may include a magnet, a suction cup, an adhesive, a clip, a tab, or another material or structure that allows the coupler disk 122 to attach to and detach from the cosmetic product. When the cosmetic product is attached to the coupler disk 122, the coupler disk 122 may allow the cosmetic product to rotate in the plane of the coupler disk 122.

Figure 2:
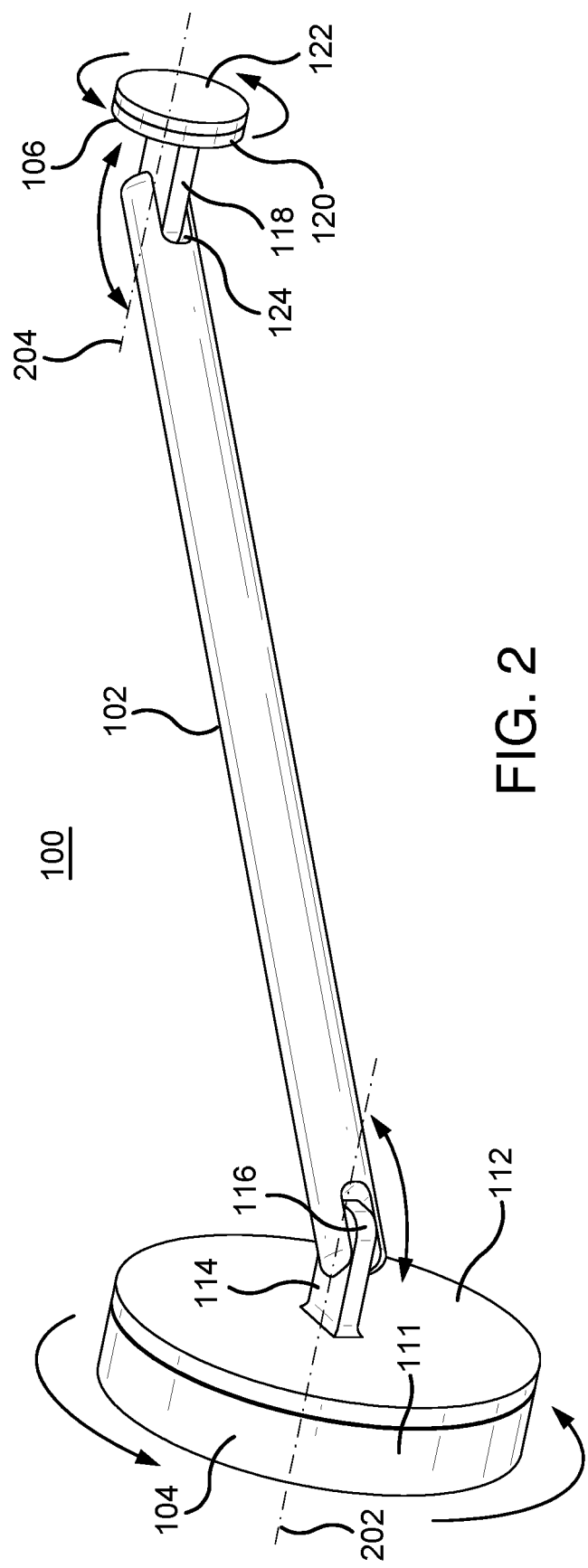
FIG. 2 illustrates the cosmetic mount of FIG. 1.

FIG. 2 illustrates the cosmetic mount 100 of FIG. 1. Specifically, FIG. 2 shows some of the motion that the cosmetic mount 100 provides. As seen in FIG. 2, the base arm 114 and the coupler arm 118 are rotatably attached to the arm 102. The base arm 114 is rotatably attached to the arm 102 by the hinge 116, and the coupler arm 118 is rotatably attached to the arm 102 by the hinge 124. The hinges 116 and 124 allow the base arm 114 and the coupler arm 118 to rotate about the hinges 116 and 124. When the base arm 114 rotates about the hinge 116, the foundation 111 and the base disk 112 also rotate about the hinge 116. When the coupler arm 118 rotates about the hinge 124, the coupler base 120 and the coupler disk 122 also rotate about the hinge 124.

The base arm 114 extends from the base disk 112. An axis 202 extends along the direction of the base arm 114. Additionally, the coupler arm 118 extends from the coupler base 120. An axis 204 extends along the direction of the coupler arm 118. When the coupler arm 118 rotate about the hinge 124, the axis 204 moves with the coupler arm 118. In other words, the axis 204 moves to track the direction of the coupler arm 118, as the coupler arm 118 rotates about the hinge 124. When the base 104 is attached to a surface, the axis 202 may become fixed. The arm 102 may rotate about the hinge 116.

The base disk 112 is coupled to the foundation 111 such that the base disk 112 and the foundation 111 may rotate, with respect to each other, in the plane of the base disk 112. Stated differently, the foundation 111 and the base disk 112 may rotate, with respect to each other, about the axis 202. When the foundation 111 is attached to a surface, the axis 202 may become fixed. The base disk 112 may rotate about the axis 202 in the plane of the base disk 112. When the base disk 112 rotates, the base arm 114 and the arm 102 rotate along with the base disk 112. As a result, the plane of rotation of the arm 102 about the hinge 116 is adjusted or rotated. Additionally, the plane of rotation of the coupler arm 118 about the hinge 124 is also adjusted or rotated.

The coupler disk 122 is coupled to the coupler base 120 such that the coupler disk 122 may rotate, with respect to the coupler base 120, in the plane of the coupler disk 122. Stated differently, the coupler disk 122 may rotate about the axis 204 in the plane of the coupler disk 122. When the coupler arm 118 rotates about the hinge 124, the axis 204 may move along with the coupler arm 118. The coupler disk 122 may continue to rotate about the axis 204 as the axis 204 moves with the coupler arm 118. When a cosmetic product (e.g., a mirror) is attached to the coupler disk 122, the coupler disk 122 may allow the cosmetic product to also rotate in the plane of the coupler disk 122.

Figure 3:
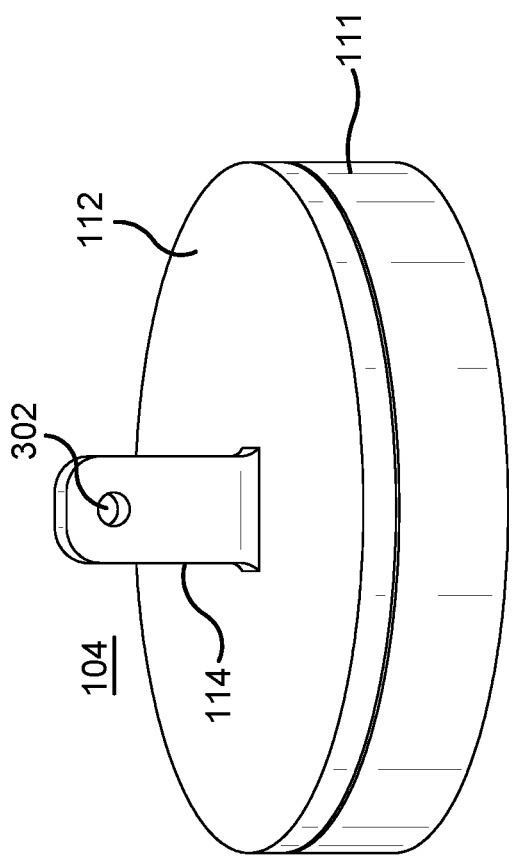
FIG. 3 illustrates an example base of the cosmetic mount of FIG. 1.

FIG. 3 illustrates an example base 104 of the cosmetic mount 100 of FIG. 1. As seen in FIG. 3, the base 104 includes the foundation 111, the base disk 112, and the base arm 114. The foundation 111 and the base disk 112 are cylindrical with similar radii. The foundation 111 has a thickness or height that is greater than the thickness or height of the base disk 112. The base arm 114 extends from a surface of the base disk 112. The foundation 111 is rotatably couple to an opposite surface of the base disk 112. The base arm 114 forms or defines a cavity 302 in the base arm 114. A bar or hinge may extend through the cavity 302 so that the base 104 may rotatably couple to the bar or hinge. As seen in previous figures, the hinge 116 at the first end 108 of the arm 102 may extend through the cavity 302 to rotatably couple the base 104 to the arm 102.

Figure 4:
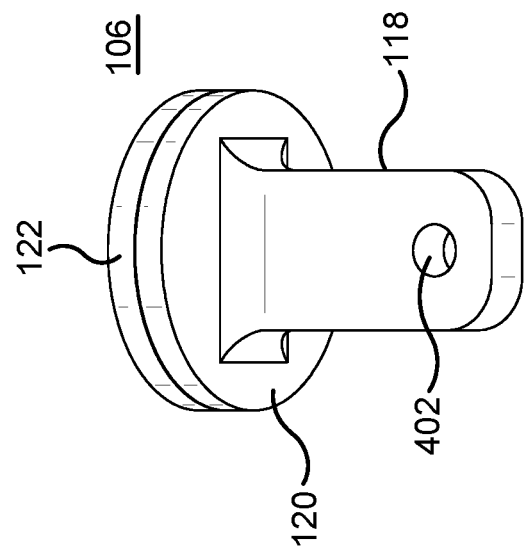
FIG. 4 illustrates an example coupler of the cosmetic mount of FIG. 1.

FIG. 4 illustrates an example coupler 106 of the cosmetic mount 100 of FIG. 1. As seen in FIG. 4, the coupler 106 includes the coupler arm 118, the coupler base 120, and the coupler disk 122. The coupler base 120 and the coupler disk 122 are cylindrical with similar radii. The coupler base 120 and the coupler disk 122 have similar thicknesses or heights. The coupler arm 118 extends from a surface of the coupler base 120. The coupler disk 122 couples to an opposite surface of the coupler base 120. The coupler disk 122 may rotatably couple to the coupler base 120 so that the coupler disk 122 may rotate, with respect to the coupler base 120, in the plane of the coupler disk 122. The coupler arm 118 forms or defines a cavity 402. A bar or hinge may extend through the cavity 402 to rotatably couple the coupler 106 to the bar or hinge. As see in previous figures, the hinge 124 may extend through the cavity 402 to rotatably couple the coupler 106 to the second end 110 of the arm 102.

Figure 5A:
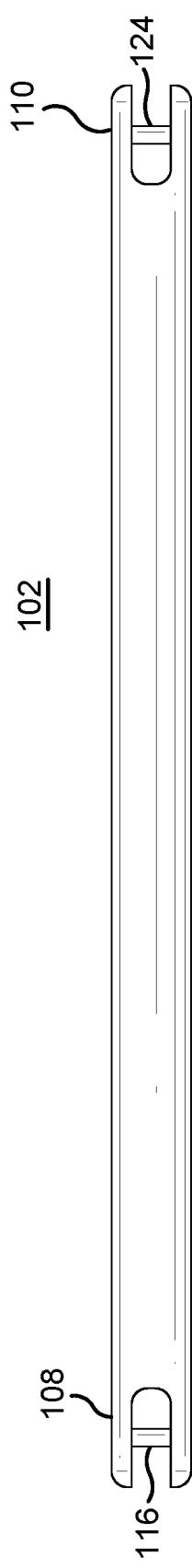
FIGS. 5A and 5B illustrate an example arm of the cosmetic mount of FIG. 1.
Figure 5B:
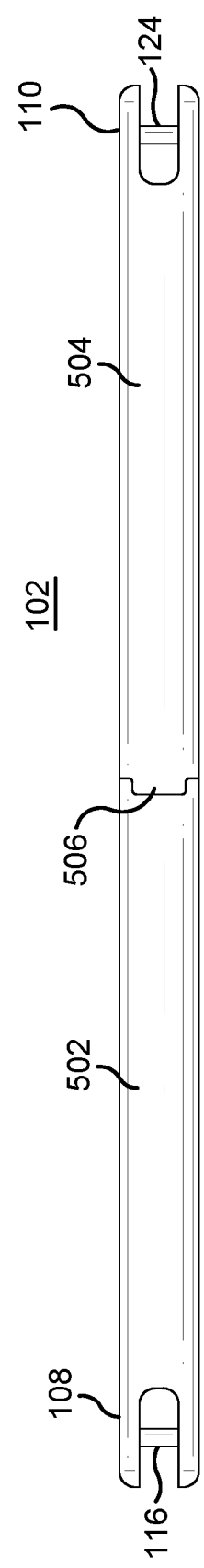

FIGS. 5A and 5B illustrate an example arm 102 of the cosmetic mount 100 of FIG. 1. As see in FIG. 5A, the arm 102 may be a rigid member that attaches to the base 104 and the coupler 106. The arm 102 includes the hinge 116 at the first end 108 of the arm 102 and the hinge 124 at the second end 110 of the arm 102. The hinge 116 may allow the base 104 to rotatably couple to the arm 102 at the first end 108. The hinge 124 may allow the coupler 106 to rotatably couple to the arm 102 at the second end 110.

As seen in FIG. 5B, the arm 102 may include a first portion 502 and a second portion 504. The first portion 502 includes the first end 108 and the hinge 116. The second portion 504 includes the second end 110 and the hinge 124. The first portion 502 may be moveably coupled to the second portion 504. For example, the first portion 502 may be rotatably coupled to the second portion 504 by a hinge 506. The hinge 506 may allow the first portion 502 and the second portion 504 to rotate towards or away from each other, which allows the arm 102 to fold or open.

Figure 6A:
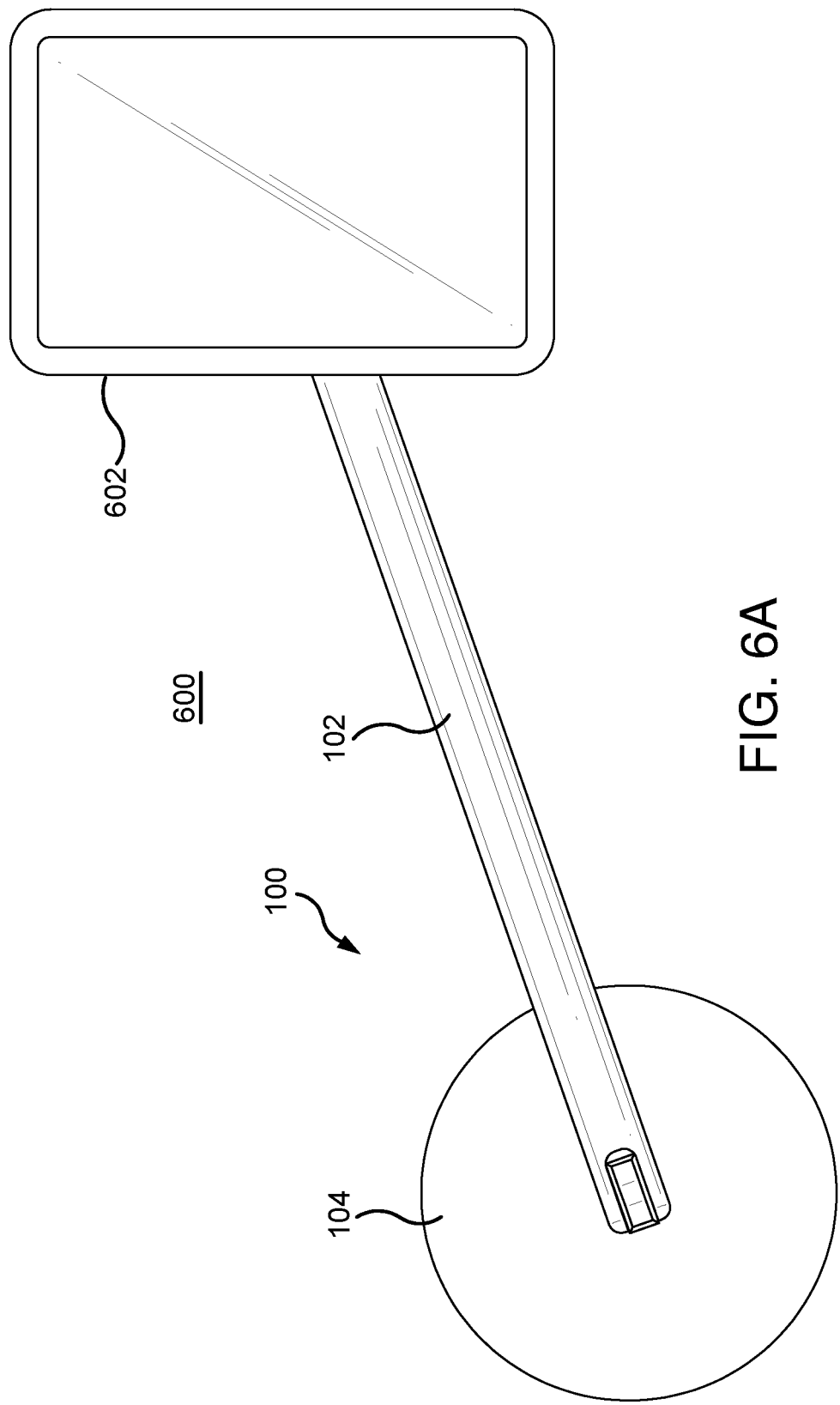
FIGS. 6A and 6B illustrate an example system.
Figure 6B:
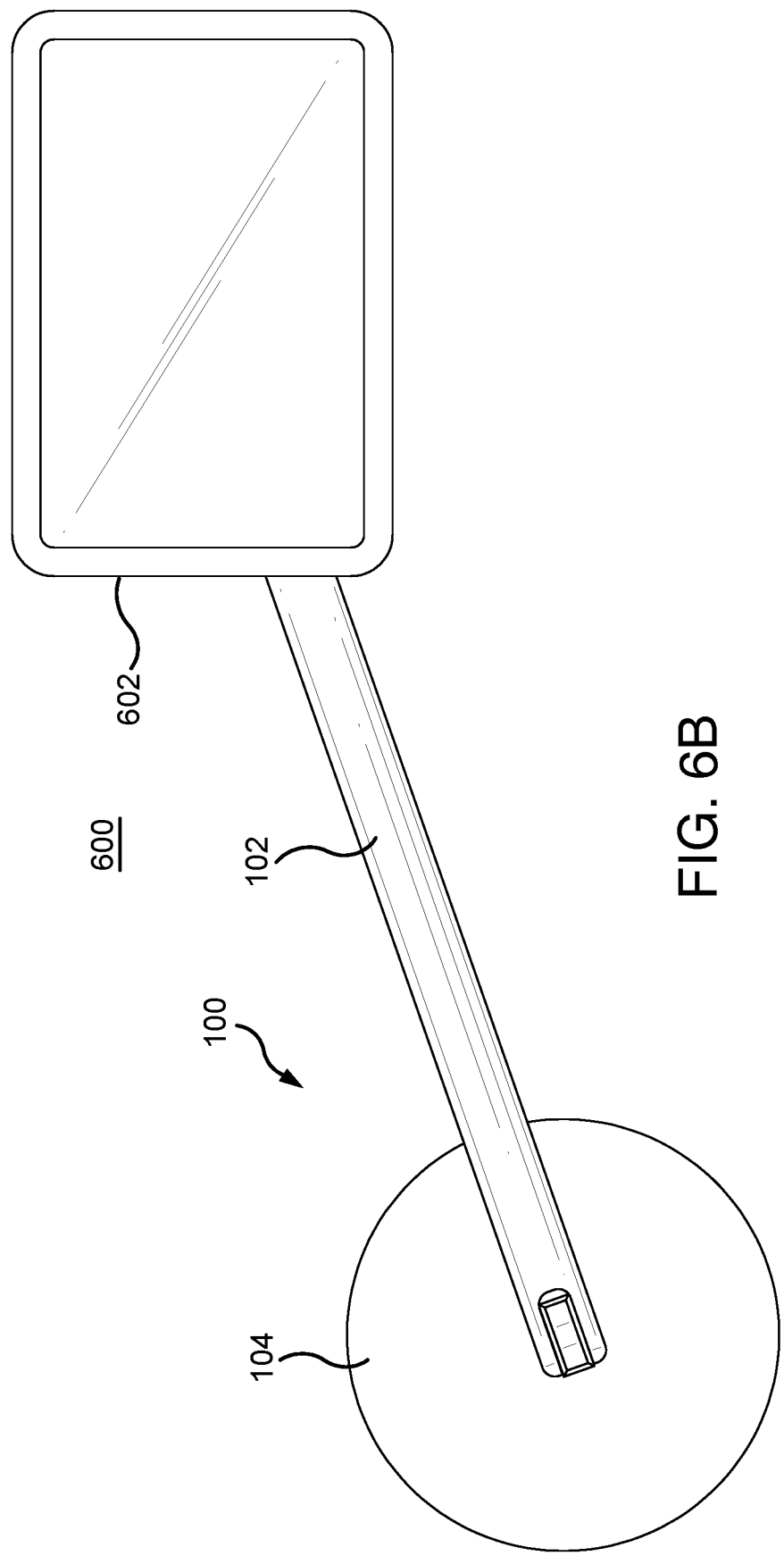

FIGS. 6A and 6B illustrate an example system 600. As seen in FIG. 6A, the system 600 includes the cosmetic mount 100 and a mirror 602. The cosmetic mount 100 includes the arm 102, the base 104, and the coupler 106 (not shown). The mirror 602 may attach to the cosmetic mount 100 by the coupler 106. For example, the coupler disk 122 may attach to a backside of the mirror 602. The mirror 602 may then move along with the other components of the cosmetic mount 100. For example, when the base disk 112 rotates about the axis 202 (as shown in FIG. 2), the mirror 602 may also move about the axis 202. In the example of FIG. 6A, the mirror 602 may move in a circle about the base 104. As another example, when the arm 102 rotates about the hinge 116 (as shown in FIG. 2), the mirror 602 may also move about the hinge 116. In the example of FIG. 6A, the mirror 602 may move in a circle about the hinge 116.

As another example, when the coupler 106 rotates about the hinge 124 (as shown in FIG. 2), the mirror 602 may also rotate about the hinge 124. In the example of FIG. 6A, the mirror 602 may move in a circle about the hinge 124. As another example, when the coupler disk 122 rotates about the axis 204 (as shown in FIG. 2), the mirror 602 may also rotate about the axis 204. In the example of FIG. 6A, the mirror 602 may rotate in the plane of the mirror 602.

FIG. 6B shows the system 600 when the mirror 602 has rotated in the plane of the mirror. As seen in FIG. 6B, the mirror 602 has rotated to a horizontal arrangement, whereas in the example of FIG. 6A, the mirror 602 has rotated into a vertical arrangement. Thus, the coupler 106 allows the mirror 602 to rotate in the plane of the mirror 602.

Any object may be attached to the coupler 106. In the previous example, the mirror 602 attached to the coupler 106. As another example, an electronic tablet may be attached to the coupler 106. The tablet may include a metal plate or metal backing that attaches to a magnet in the coupler 106, or the tablet may include a magnet that attaches to metal in the coupler 106. In some instances, the tablet may be positioned within a case that attaches to the coupler 106. The tablet case may include a metal plate that attaches to a magnet in the coupler 106, or the tablet case may include a magnet that attaches to metal in the coupler 106. A camera on the tablet may capture images or video, and the tablet may display the images or video. In this manner, the tablet may serve as a mirror.

In some embodiments, the tablet case is a security case that protects the tablet (e.g., from theft, damage, or the elements). For example, the security may make it difficult to remove the tablet from the case or to detach the security case from the coupler 106. As another example, the security case may absorb the impact forces caused by dropping or hitting the security case and tablet. As yet another example, the security case may shield the tablet from exposure to water or debris. In this manner, the tablet case improves the security of the tablet.

Figure 7:
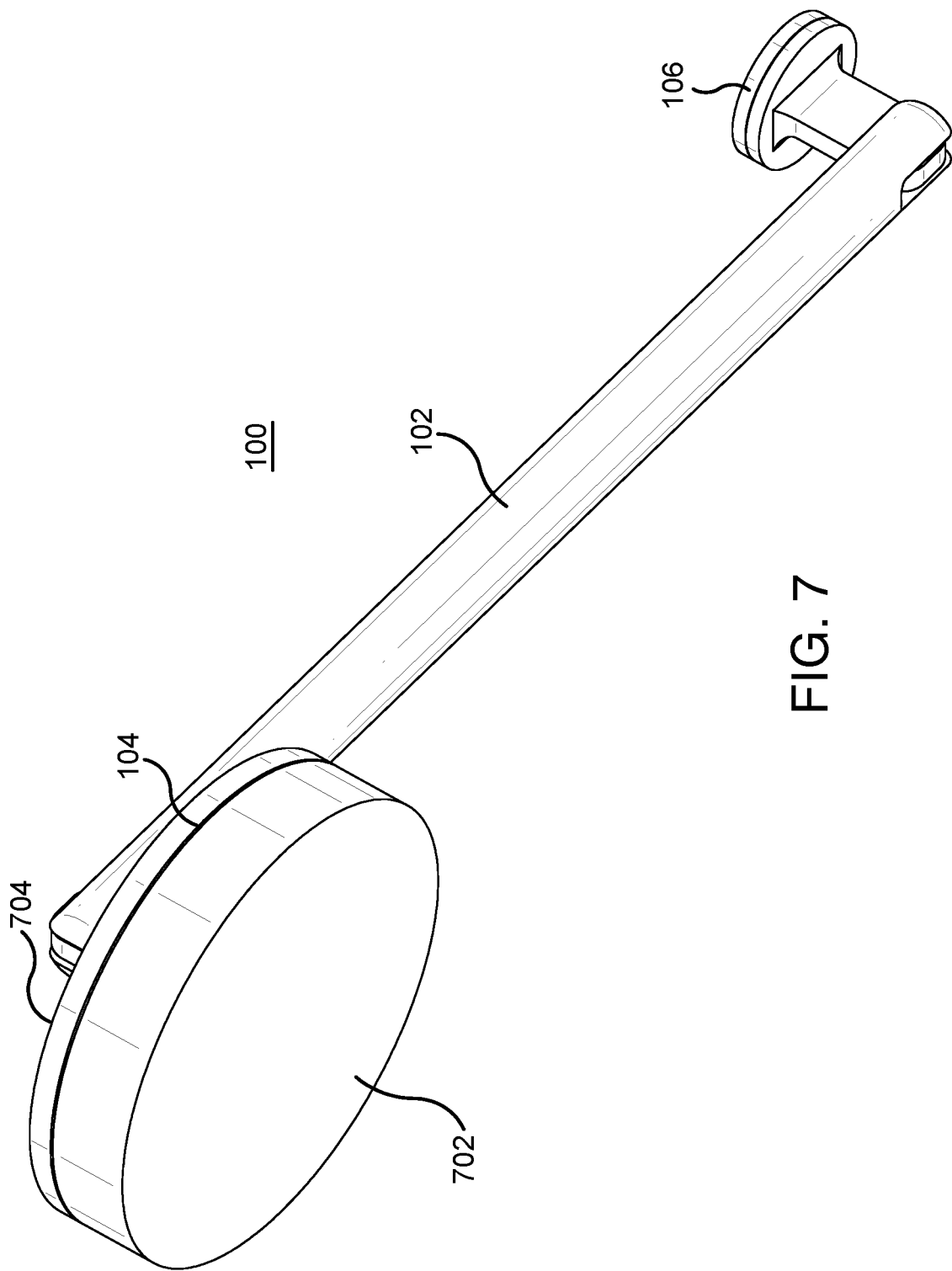
FIG. 7 illustrates the cosmetic mount of FIG. 1.

FIG. 7 illustrates the cosmetic mount 100 of FIG. 1. As seen in FIG. 7, the cosmetic mount 100 includes the arm 102, the base 104, and the coupler 106. The base 104 includes a surface 702 and a surface 704. The surface 702 is opposite the surface 704. The arm 102 may couple to the base 104 at the surface 704. The surface 702 may include a component or material that allows the base 104 to attach to a surface. For example, a magnet, a suction cup, an adhesive, or another material may be positioned on the surface 702. The surface 702 may then be pressed against another surface (e.g., a wall) to attach the base 104 to the surface. For example, if a magnet is positioned on the surface 702, then the base 104 may be pressed against a metallic surface to attach the magnet and the base 104 to that surface. As another example, a suction cup may be positioned on the surface 702. The base 104 may be pressed against a surface (e.g., a mirror or a tile) to attach the suction cup and the base 104 to the mirror or tile.

Figure 8:
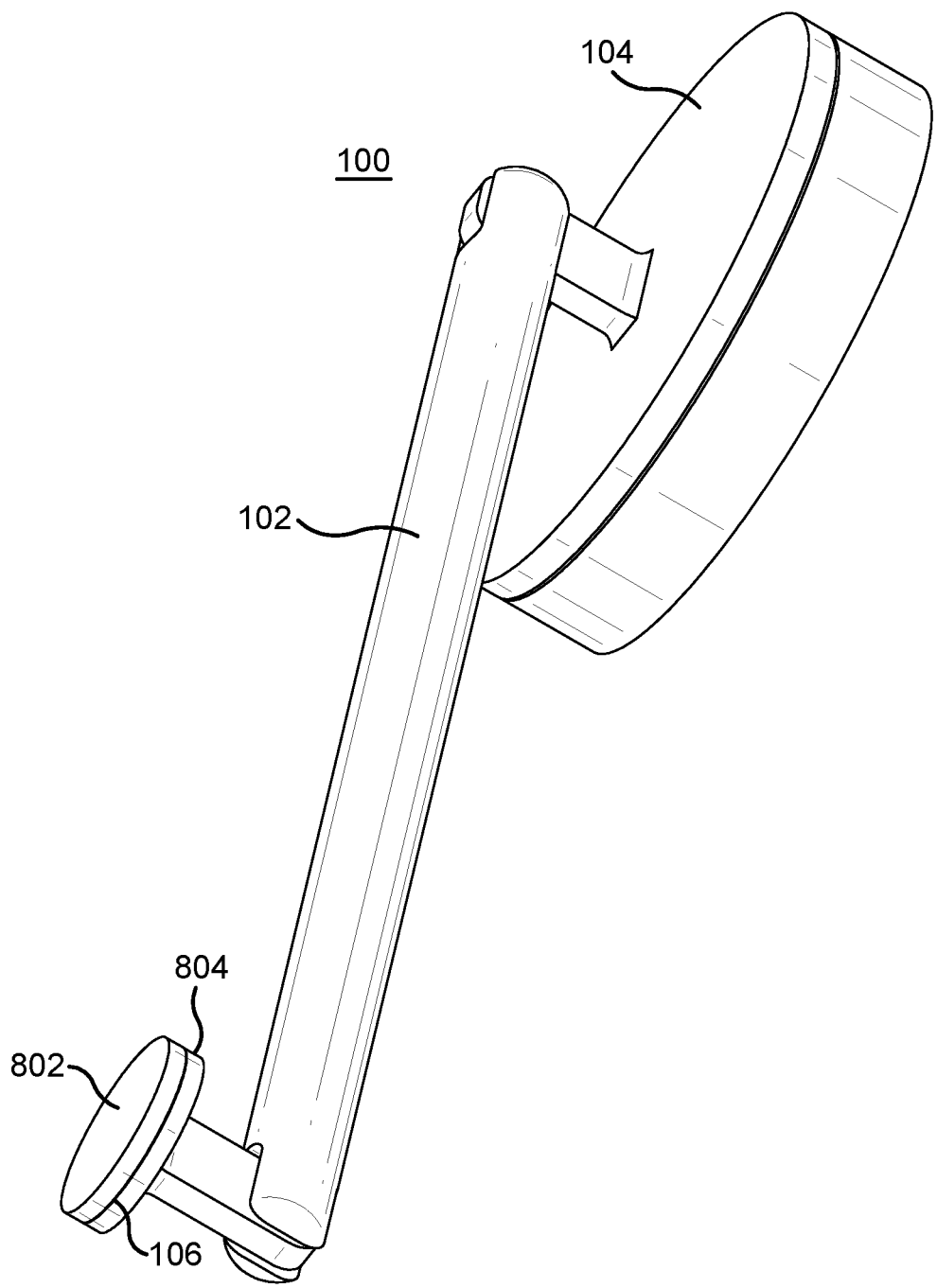
FIG. 8 illustrates the cosmetic mount of FIG. 1.

FIG. 8 illustrates the cosmetic mount 100 of FIG. 1. As seen in FIG. 8, the cosmetic mount 100 includes the arm 102, the base 104, and the coupler 106. The coupler 106 includes a surface 802 and a surface 804. The surface 802 may be opposite the surface 804. The arm 102 may attach to the coupler 106 at the surface 804. A cosmetic product (e.g., the mirror 602) may attach to the coupler 106 at the surface 802.

The surface 802 may include a component that allows the coupler 106 to attach to the cosmetic product. For example, the surface 802 may include a magnet, a suction cup, an adhesive, or another material that attaches to the cosmetic product. If the surface 802 includes a magnet, then the surface 802 may be pressed against the back of a metal cosmetic product to attach the magnet and the coupler 106 to the cosmetic product. As another example, if the surface 802 includes a suction cup, then the suction cup may be pressed against a smooth portion of the cosmetic product to attach the suction cup and the coupler 106 to the cosmetic product. The surface 802 may include a physical structure, like a clip or a tab, that engages with the cosmetic product to attach the cosmetic product to the coupler 106. For example, a clip or a tab may engage a slot or a ridge on the cosmetic product to attach the cosmetic product to the coupler 106.

In summary, the cosmetic mount 100 may be used to mount a cosmetic product (e.g., a mirror 602) to a surface (e.g., a wall). The cosmetic mount 100 may include several components that allow for several degrees of rotation and movement. The cosmetic mount 100 includes a base 104 that attaches to the surface (e.g., using magnets, suction cups, screws, an adhesive, or any other suitable attachment mechanism). The cosmetic mount 100 includes an arm 102 rotatably attached to the base 104, and the cosmetic mount 100 includes a coupler 106 rotatably attached to the arm 102. The coupler 106 includes a coupler disk 122 that can attach to the cosmetic product (e.g., using magnets, suction cups, an adhesive, etc.). The coupler disk 122 may spin in-plane like a wheel. As a result, when the cosmetic product is attached to the coupler disk 122, the cosmetic product may also spin or rotate in-plane (e.g., in the plane of the cosmetic product). When a user has finished using the cosmetic product, the user may detach the cosmetic product from the coupler disk 122 and detach the cosmetic mount 100 from the surface. In this manner, the cosmetic mount 100 provides for several degrees of motion (e.g., in-plane rotation of the cosmetic product) and allows for attachment to and detachment from many types of surfaces.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," or "at least one of A or B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

In view of the foregoing, the scope of the present disclosure is determined by the claims that follow.

I claim:

1. A cosmetic mount comprising:
    an arm comprising (i) a first bar at a first end of the arm and (ii) a second bar at a second end of the arm opposite the first end of the arm;
    a base comprising:
        a base arm defining a first cavity, wherein the first bar extends through the first cavity to couple the base arm to the first end of the arm such that the arm is rotatable at the first end about a first axis;
        a base disk coupled to the base arm; and
        a foundation coupled directly to the base disk such that the foundation is rotatable on the base disk about a second axis different from the first axis; and
    a coupler comprising:
        a coupler arm defining a second cavity, wherein the second bar extends through the second cavity to couple the coupler arm to the second end of the arm such that the coupler arm is rotatable at the second end about a third axis;
        a coupler base coupled to the coupler arm; and
        a coupler disk directly coupled to the coupler base such that the coupler disk is rotatable on the coupler base about a fourth axis different from the third axis.

2. The cosmetic mount of claim 1, wherein the coupler disk is arranged to engage a mirror or a tablet such that the mirror or the tablet is rotatable in-plane.

3. The cosmetic mount of claim 1, wherein the third axis is the first axis.

4. The cosmetic mount of claim 1, wherein the base arm extends from the base disk along the first axis.

5. The cosmetic mount of claim 3, wherein the coupler arm extends from the coupler base along the fourth axis.

6. The cosmetic mount of claim 1, wherein the arm comprises a first portion and a second portion rotatably coupled to the first portion.

7. The cosmetic mount of claim 6, wherein the first portion comprises the first end, and wherein the second portion comprises the second end.

8. The cosmetic mount of claim 1, wherein the fourth first axis moves when the coupler arm rotates about the arm.

9. A system comprising:
    an arm comprising (i) a first bar at a first end of the arm and (ii) a second bar at a second end of the arm opposite the first end of the arm;
    a base comprising:
        a base arm defining a first cavity, wherein the first bar extends through the first cavity to couple the base arm to the first end of the arm such that the arm is rotatable at the first end about a first axis;
        a base disk coupled to the base arm; and
        a foundation coupled directly to the base disk such that the foundation is rotatable on the base disk about a second axis different from the first axis; and
    a coupler comprising:
        a coupler arm defining a second cavity, wherein the second bar extends through the second cavity to couple the coupler arm to the second end of the arm such that the coupler arm is rotatable at the second end about a third axis;
        a coupler base coupled to the coupler arm; and
        a coupler disk directly coupled to the coupler base such that the coupler disk is rotatable on the coupler base about a fourth axis different from the third axis; and
    a mirror arranged to engage the coupler disk such that the mirror is rotatable in-plane.

10. The system of claim 9, wherein the third axis is the first axis.

11. The system of claim 10, wherein the base arm extends from the base disk along the first axis.

12. The system of claim 10, wherein the coupler arm extends from the coupler base along the fourth axis.

13. The system of claim 9, wherein the arm comprises a first portion and a second portion rotatably coupled to the first portion.

14. The system of claim 13, wherein the first portion comprises the first end.

15. An apparatus comprising:
    an arm comprising (i) a first bar at a first end of the arm and (ii) a second bar at a second end of the arm opposite the first end of the arm;

a base arm defining a first cavity, wherein the first bar extends through the first cavity to couple the base arm to the first end of the arm such that the arm is rotatable at the first end about a first axis;

a base disk coupled to the base arm;

a foundation coupled to the base disk such that the foundation is rotatable on the base disk about a second axis different from the first axis;

a coupler arm defining a second cavity, wherein the second bar extends through the second cavity to couple the coupler arm to the second end of the arm such that the coupler arm is rotatable at the second end about a third axis;

a coupler base coupled to the coupler arm; and a coupler disk directly coupled to the coupler base such that the coupler disk is rotatable on the coupler base about a fourth axis different from the third axis.

* * * * *